(12) United States Patent
Ohwe

(10) Patent No.: US 7,944,648 B2
(45) Date of Patent: May 17, 2011

(54) HEAD SLIDER AND STORAGE MEDIUM DRIVING DEVICE

(75) Inventor: Takeshi Ohwe, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/632,755

(22) Filed: Dec. 7, 2009

(65) Prior Publication Data

US 2010/0091401 A1    Apr. 15, 2010

Related U.S. Application Data

(63) Continuation of application No. PCT/JP2007/061566, filed on Jun. 7, 2007.

(51) Int. Cl.
*G11B 21/20* (2006.01)

(52) U.S. Cl. .................................... 360/234.5

(58) Field of Classification Search .................. None
See application file for complete search history.

(56) References Cited

U.S. PATENT DOCUMENTS

| | | | |
|---|---|---|---|
| 4,423,401 A | 12/1983 | Mueller | |
| 6,233,127 B1 | 5/2001 | Shimazawa | |
| 6,633,463 B1 * | 10/2003 | Inoue et al. | 360/320 |
| 6,813,122 B1 | 11/2004 | Granstrom | |
| 7,375,516 B2 * | 5/2008 | Takenaga et al. | 324/252 |
| 7,375,931 B2 * | 5/2008 | Jayasekara et al. | 360/323 |
| 7,508,203 B2 * | 3/2009 | Takenaga et al. | 324/252 |
| 2002/0060888 A1 | 5/2002 | Kanda | |
| 2004/0125512 A1 * | 7/2004 | Kikuiri | 360/313 |
| 2007/0076328 A1 * | 4/2007 | Jayasekara et al. | 360/323 |
| 2007/0165334 A1 * | 7/2007 | Takenaga et al. | 360/313 |
| 2008/0037182 A1 * | 2/2008 | Albrecht et al. | 360/323 |
| 2008/0186635 A1 * | 8/2008 | Takenaga et al. | 360/313 |

FOREIGN PATENT DOCUMENTS

| | | |
|---|---|---|
| EP | 0 651 375 A1 | 10/1994 |
| JP | 59-73826 | 4/1984 |
| JP | 07-169005 | 7/1995 |
| JP | 2000-011349 | 1/2000 |
| JP | 2001-307309 | 11/2001 |
| WO | WO 00/79522 | 12/2000 |

OTHER PUBLICATIONS

Notice of Rejection issued by Japan Patent Office on Feb. 22, 2010 in the corresponding Japanese patent application No. 2009-517661.
International Preliminary Report on Patentability in the corresponding PCT application No. PCT/JP2007/061566.
International Search Report mailed by Japanese Patent Office on Jul. 31, 2007.
Prior Art Information List.

\* cited by examiner

*Primary Examiner* — Daniell L Negrón
*Assistant Examiner* — Huy D Nguyen
(74) *Attorney, Agent, or Firm* — Knobbe, Martens, Olson & Bear LLP

(57) ABSTRACT

According to one embodiment, a head slider, includes: a slider body; an insulating nonmagnetic film configured to be laminated on an air outflow side end face of the slider body; a magnetoresistive effect film configured to be buried in the nonmagnetic film; first and second wiring patterns configured to be buried in the nonmagnetic film and connected to the magnetoresistive effect film; a third wiring pattern configured to be buried in the nonmagnetic film and connected to the first and second wiring pattern in parallel to the magnetoresistive effect film; and a switch element configured to be buried in the nonmagnetic film and change conductivity of the third wiring pattern between conduction and non-conduction.

7 Claims, 14 Drawing Sheets

HEAD SLIDER AND STORAGE MEDIUM DRIVING DEVICE

CROSS-REFERENCE TO RELATED APPLICATIONS

This application is a continuation of PCT international application Ser. No. PCT/JP2007/061566 filed on Jun. 7, 2007 which designates the United States, incorporated herein by reference.

BACKGROUND

1. Field

One embodiment of the invention relates to a head slider that is incorporated in a storage medium driving device, such as a hard disk drive (HDD).

2. Description of the Related Art

For example, as illustrated in FIG. 1 of Japanese Patent Application Publication (KOKAI) No. 2000-11349, a wiring pattern is connected to a magnetoresistive effect film. The wiring pattern constitutes a flow passage to supply a sense current to the magnetoresistive effect film mounted in a head slider. In the wiring pattern, a switch is connected to the magnetoresistive effect film in parallel. When the magnetoresistive effect film is short-circuited by switching of the switch, an overcurrent is prevented from flowing through the magnetoresistive effect film. The magnetoresistive effect film is prevented from being broken. Japanese Patent Application Publication (KOKAI) No. H7-169005, International Publication WO 00/079522 pamphlet, and U.S. Pat. No. 6,813,122 also correspond to the related technology.

As illustrated in FIG. 14 of Japanese Patent Application Publication (KOKAI) No. 2000-11349, the wiring pattern is formed on a head suspension that supports the head slider. The switch is inserted into the wiring pattern on the head suspension. Accordingly, if the overcurrent flows through the wiring pattern due to an electrostatic discharge (ESD) between the switch and the head slider, a potential difference is generated between both ends of the magnetoresistive effect film, even though the switch is closed. The overcurrent may flow through the magnetoresistive effect film. The magnetoresistive effect film may be broken.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
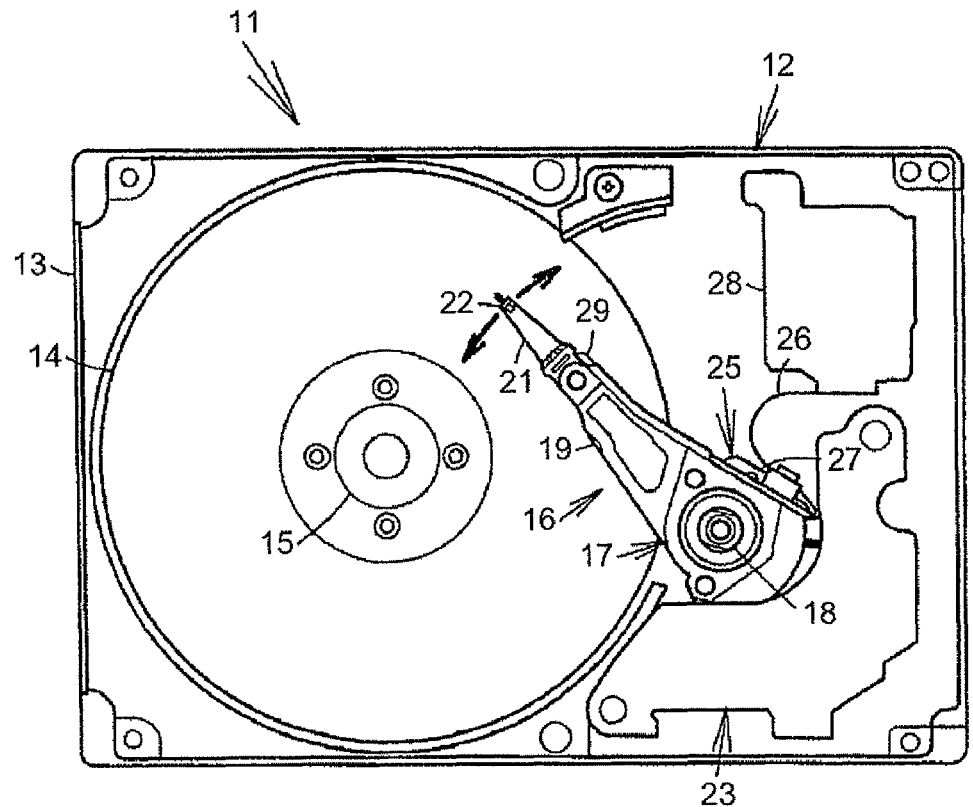
FIG. 1 is an exemplary plan view of a schematic internal structure of a hard disk drive (HDD) that is a storage medium driving device according to an embodiment of the invention.

Embodiments according to the invention will be described hereinafter with reference to the accompanying drawings. In general, according to one embodiment of the invention, a head slider, includes: a slider body; an insulating nonmagnetic film configured to be laminated on an air outflow side end face of the slider body; a magnetoresistive effect film configured to be buried in the nonmagnetic film; first and second wiring patterns configured to be buried in the nonmagnetic film and connected to the magnetoresistive effect film; a third wiring pattern configured to be buried in the nonmagnetic film and connected to the first and second wiring pattern in parallel to the magnetoresistive effect film; and a switch element configured to be buried in the nonmagnetic film and change conductivity of the third wiring pattern between conduction and non-conduction.

According to another embodiment of the invention, a head module, includes: an insulating nonmagnetic film; a magnetoresistive effect film configured to be buried in the nonmagnetic film and constitute a reading head; first and second wiring patterns configured to be buried in the nonmagnetic film and connected to the magnetoresistive effect film; a third wiring pattern configured to be buried in the nonmagnetic film and connected to the first and second wiring patterns in parallel to the magnetoresistive effect film; and a switch element configured to be buried in the nonmagnetic film and change the conductivity of the third wiring pattern between conduction and non-conduction.

According to still another embodiment of the invention, a storage medium driving device that positions a head slider to a target position on a storage medium, the head slider includes: a slider body; an insulating nonmagnetic film configured to be laminated on an air outflow side end face of the slider body; a magnetoresistive effect film configured to be buried in the nonmagnetic film; first and second wiring patterns configured to be buried in the nonmagnetic film and connected to the magnetoresistive effect film; a third wiring pattern configured to be buried in the nonmagnetic film and connected to the first and second wiring patterns in parallel to the magnetoresistive effect film; and a switch element configured to be buried in the nonmagnetic film and change the conductivity of the third wiring pattern between conduction and non-conduction.

According to still another embodiment of the invention, a head slider, includes: a slider body; an insulating nonmagnetic film configured to be laminated on an air outflow side end face of the slider body; first and second wiring patterns configured to be buried in the nonmagnetic film and connected to the magnetoresistive effect film; a first conductive terminal configured to be connected to the first wiring pattern and formed on the air outflow side end face of the nonmagnetic film; a second conductive terminal configured to be connected to the second wiring pattern and formed on the air outflow side end face of the nonmagnetic film; a third wiring pattern configured to be laminated on the air outflow side end face of the nonmagnetic film and connected to the first and second conductive terminals; and a switch element configured to be laminated on the air outflow side end face of the nonmagnetic film and change conductivity of the third wiring pattern between conduction and non-conduction.

According to still another embodiment of the invention, a head module, includes: an insulating nonmagnetic film; first and second wiring patterns configured to be buried in the nonmagnetic film and connected to a magnetoresistive effect film; a first conductive terminal configured to be connected to the first wiring pattern and formed on an air outflow side end face of the nonmagnetic film; a second conductive terminal configured to be connected to the second wiring pattern and formed on the air outflow side end face of the nonmagnetic film; a third wiring pattern configured to be laminated on the air outflow side end face of the nonmagnetic film and connected to the first and second conductive terminals; and a switch element configured to be laminated on the air outflow side end face of the nonmagnetic film and change conductivity of the third wiring pattern between conduction and non-conduction.

According to still another embodiment of the invention, a storage medium driving device that positions a head slider to a target position on a storage medium, the head slider includes: a slider body; an insulating nonmagnetic film configured to be laminated on an air outflow side end face of the slider body; first and second wiring patterns configured to be buried in the nonmagnetic film and connected to a magnetoresistive effect film; a first conductive terminal configured to be connected to the first wiring pattern and formed on the air outflow side end face of the nonmagnetic film; a second conductive terminal configured to be connected to the second wiring pattern and formed on the air outflow side end face of the nonmagnetic film; a third wiring pattern configured to be laminated on the air outflow side end face of the nonmagnetic film and connected to the first and second conductive terminals; and a switch element configured to be laminated on the air outflow side end face of the nonmagnetic film and change conductivity of the third wiring pattern between conduction and non-conduction.

According to still another embodiment of the invention, a method of manufacturing a head slider, includes: forming a pair of wiring patterns on an insulating first nonmagnetic film formed on a base at a predetermined interval; forming a conductive switch element to establish conduction between the wiring patterns; forming an insulating second nonmagnetic film on the switch element while securing a void allowing a deformation of the switch element on the first nonmagnetic film; forming a magnetoresistive effect film on the second nonmagnetic film; and forming first and second wiring patterns connected to the magnetoresistive effect film, wherein the wiring patterns are connected to the first and second wiring patterns in parallel to the magnetoresistive effect film.

FIG. 1 illustrates a schematic internal structure of a hard disk drive (HDD) 11 that is one example of a storage medium driving device according to an embodiment of the invention. The HDD 11 comprises a housing 12 that is a casing. The housing 12 comprises a box-like base 13 and a cover (not illustrated). The base 13 defines an internal space of a flat rectangular body, that is, an accommodation space. The base 13 may be molded from a metal material, such as Aluminum, on the basis of a casting. The cover is coupled to an opening of the base 13. An accommodation space that is formed between the cover and the base 13 is closed. The cover may be molded from one plate, on the basis of press working.

In the accommodation space, one or more magnetic disks 14 that function as storage media are accommodated. The magnetic disk 14 is mounted in a spindle motor 15. The spindle motor 15 can rotate the magnetic disk 14 at a high rotation speed of 3600 round per minute (rpm), 4200 rpm, 5400 rpm, 7200 rpm, 10000 rpm, or 15000 rpm.

In the accommodation space, a carriage 16 is further accommodated. The carriage 16 comprises a carriage block 17. The carriage block 17 is rotatably coupled to a spindle 18 that extends in a vertical direction. In the carriage block 17, a plurality of carriage arms 19 that extend in a horizontal direction from the spindle 18 are defined. The carriage block 17 may be molded from Aluminum, on the basis of extrusion molding.

A head suspension 21 is attached to a front end of each carriage arm 19. The head suspension 21 extends forward from the front end of the carriage arm 19. A flexure that will be described in detail below is attached to the head suspension 21. A floating head slider 22 is supported on the flexure. The floating head slider 22 can vary the posture with respect to the head suspension 21, on the basis of the flexure. In the floating head slider 22, a magnetic head, that is, an electromagnetic converting element is mounted.

If the magnetic disk 14 rotates and airflow is generated on a surface of the magnetic disk 14, positive pressure, that is, buoyancy and negative pressure are applied to the floating head slider 22 due to the airflow. Since the buoyancy and the negative pressure and the pressing force of the head suspension 21 are balanced, the floating head slider 22 can continuously float with relatively high rigidity during the rotation of the magnetic disk 14.

If the carriage 16 rotates by the rotation of the spindle 18 during the floating of the floating head slider 22, the floating head slider 22 can move along a radius line of the magnetic disk 14. As a result, the electromagnetic converting element on the floating head slider 22 can cross a data zone between innermost circumferential recording track and an outermost circumferential recording track. In this way, the electromagnetic converting element on the floating head slider 22 can be positioned on a target recording track.

The carriage block 17 is connected to a power source, such as a voice coil motor (VCM) 23. By a function of the VCM 23, the carriage block 17 can rotate by the rotation of the spindle 18. If the carriage block 17 rotates, the carriage arm 19 and the head suspension 21 are swung.

As apparent from FIG. 1, a flexible printed board unit 25 is disposed on the carriage block 17. The flexible printed board unit 25 comprises a flexible printed board 26. In the flexible printed board 26, a head integrated circuit (IC) 27 is mounted. When magnetic information is read, a sense current is supplied from the head IC 27 to a reading head element of the electromagnetic converting element. Similarly, when magnetic information is written, a write current is supplied from the head IC 27 to a writing head element of the electromagnetic converting element. The head IC 27 is supplied with the sense current or the write current from a small circuit board 28 disposed in the accommodation space or a printed circuit board (not illustrated) attached to the rear side of a bottom plate of the base 13.

A flexible printed board 29 is used to supply the sense current or the write current. On one end of the flexible printed board 29 is partially attached to the individual head suspension 21. The flexible printed board 29 extends backward along the edge of the carriage arm 19 from the head suspension 21. A rear end of the flexible printed board 29 overlaps the flexible printed board 26. The flexible printed board 29 is composed of a so-called long-tail-type flexible printed board.

In the other end of the flexible printed board 29, the floating head slider 22 is supported. That is, the flexible printed board 29 constitutes a flexure. The flexible printed board 29 comprises a plurality of wiring patterns (not illustrated). One end of the wiring pattern is connected to the floating head slider 22. The other end of the wiring pattern is connected to the flexible printed board 26. In this way, the floating head slider 22 is electrically connected to the head IC 27. The flexible printed board 29 comprises a thin metal plate, such as a stainless steel plate, and an insulating layer, a conductive layer, and a protective layer that are sequentially laminated on the thin metal plate. The conductive layer constitutes the above-described wiring pattern. In the insulating layer and the protective layer, a resin material, such as a polyimide resin, may be used.

Figure 2:
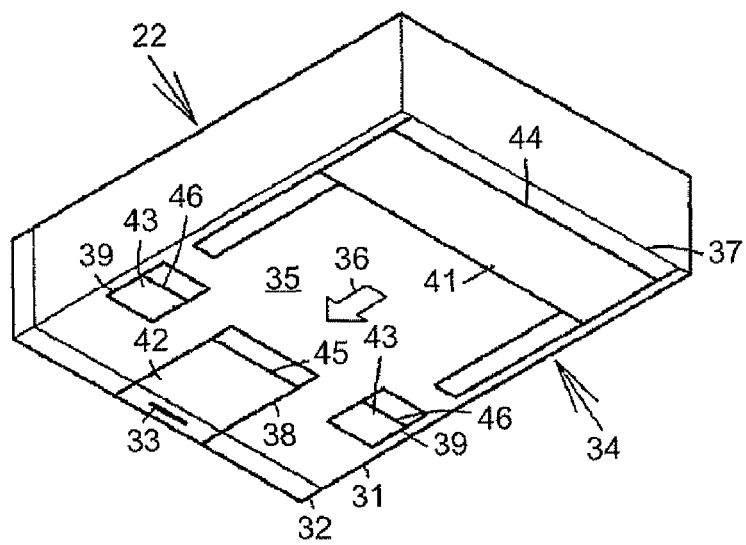
FIG. 2 is an exemplary perspective view of a schematic structure of a floating head slider in the embodiment.

FIG. 2 illustrates the floating head slider 22 of the embodiment. The floating head slider 22 comprises a base that is formed in a flat rectangular body, that is, a slider body 31. In an air outflow side end face of the slider body 31, an insulating nonmagnetic film, that is, an element incorporation film 32 is laminated. In the element incorporation film 32, an electromagnetic converting element 33 is incorporated. The electromagnetic converting element 33 will be described in detail below.

The slider body 31 may be formed of a hard nonmagnetic material, such as $Al_2O_3$—TiC (Alumina-Titanium Carbide). The element incorporation film 32 may be formed of a relatively hard insulating nonmagnetic material, such as $Al_2O_3$ (Alumina). The slider body 31 faces the magnetic disk 14 on a medium facing surface 34. In the medium facing surface 34, a flat base surface 35, that is, a reference surface is defined. If the magnetic disk 14 rotates, in the medium facing surface 34, airflow is circulated from a front end of the slider body 31 to a rear end thereof.

In the medium facing surface 34, a front rail 37 of one stripe that rises from the base surface 35 at the upstream side of an airflow 36, that is, the air inflow side is formed. The front rail 37 extends in a slider width direction along the air inflow end of the base surface 35. Similarly, in the medium facing surface 34, a rear rail 38 that rises from the base surface 35 at the downstream side of the airflow, that is, the air outflow side is formed. The rear rail 38 is disposed at a central position of the slider width direction.

In the medium facing surface 34, a pair of left and right auxiliary rear rails 39 and 39 that rise from the base surface 35 at the air outflow side are further formed. The auxiliary rear rails 39 and 39 are disposed along the left and right edges of the base surface 35, respectively. As a result, the auxiliary rear rails 39 and 39 are disposed at a predetermined interval in the slider width direction. The rear rail 38 is disposed between the auxiliary rear rails 39 and 39.

On the top surfaces of the front rail 37, the rear rail 38, and the auxiliary rear rails 39 and 39, air bearing surfaces (ABS) 41, 42, and 43 are defined. Air inflow ends of the ABS 41, 42, and 43 are connected to the top surfaces of the rails 37, 38, and 39 at stepped portions 44, 45, and 46. The airflow 36 that is generated when the magnetic disk 14 rotates is received in the medium facing surface 34. At this time, in the ABS 41, 42, and 43, relatively strong positive pressure, that is, buoyancy is generated by functions of the stepped portions 44, 45, and 46. At the back of the front rail 37, strong negative pressure is generated. The floating posture of the floating head slider 22 is established on the basis of the balance of the buoyancy and the negative pressure. The form of the floating head slider 22 is not limited to the above form.

Figure 3:
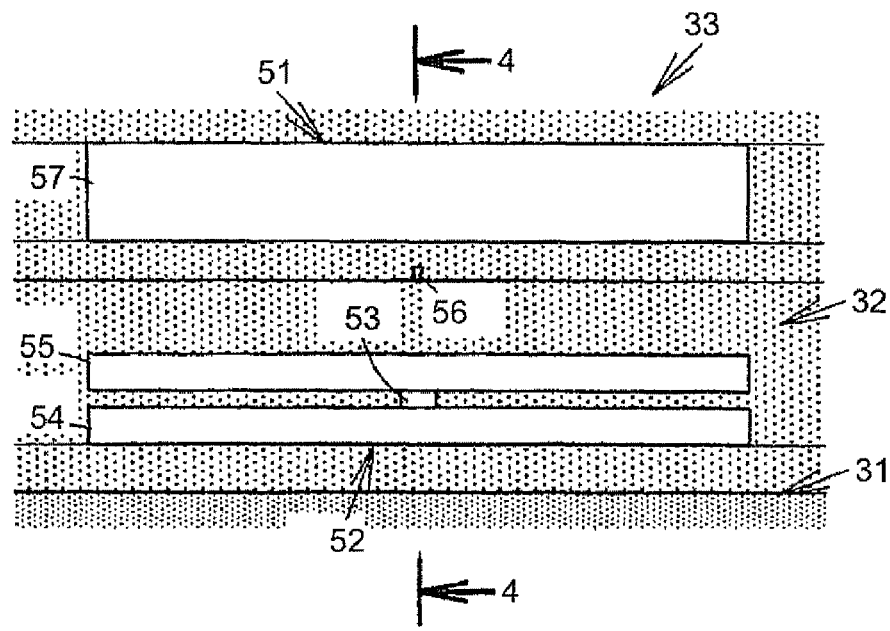
FIG. 3 is an exemplary enlarged front view of an electromagnetic converting element in the embodiment.

FIG. 3 illustrates the electromagnetic converting element 33 in details. The electromagnetic converting element 33 comprises a writing head element, that is, a single magnetic pole head 51 and a reading head element 52. The single magnetic pole head 51 and the reading head element 52 are buried in the element incorporation film 32. In the element incorporation film 32, the single magnetic pole head 51 is disposed to be closer to the air outflow side than the reading head element 52. As well known already, the single magnetic pole head 51 can use a magnetic field generated by a magnetic coil to write binary information in the magnetic disk 14. In the reading head element 52, for example, a tunnel magnetoresistive (TMR) effect element is used. As well known already, in the reading head element 52, binary information can be detected on the basis of resistance, which varies according to a magnetic field applied from the magnetic disk 14.

In the reading head element 52, a magnetoresistive effect film 53 is interposed between a pair of upper and lower conductive layers, that is, a lower shield layer 54 and an upper shield layer 55. Each of the lower shield layer 54 and the upper shield layer 55 may be made of a magnetic material, such as FeN or NiFe. An interval between the lower shield layer 54 and the upper shield layer 55 determine resolution of a magnetic record in a line direction of a record track on the magnetic disk 14.

Figure 4:
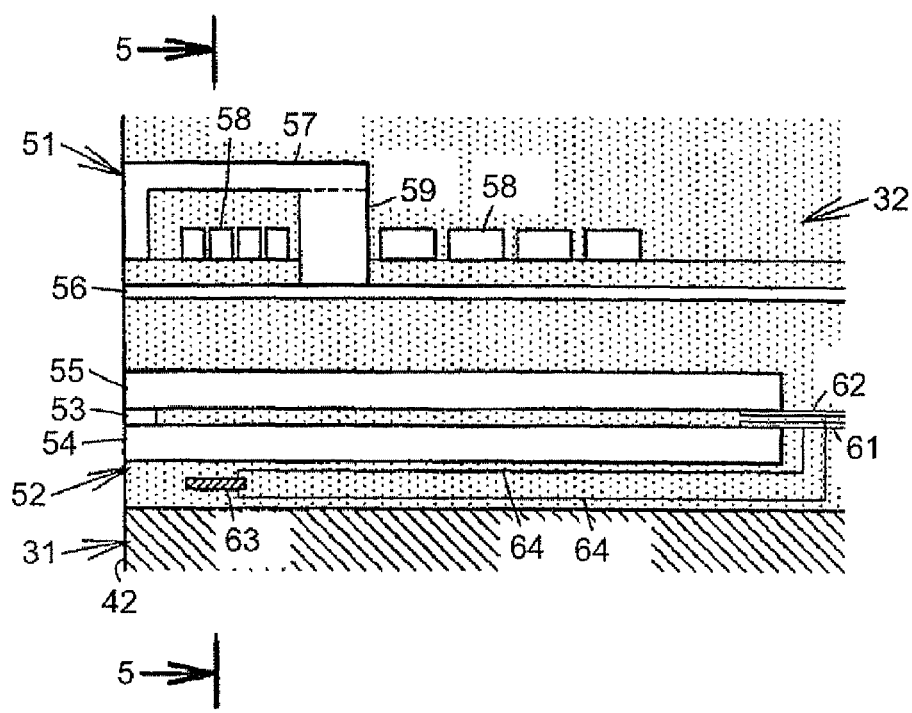
FIG. 4 is an exemplary vertical cross-sectional view taken along the line 4-4 of FIG. 3 in the embodiment.

The single magnetic pole head 51 comprises a main magnetic pole 56 and an auxiliary magnetic pole 57 that are exposed to the ABS 42. Each of the main magnetic pole 56 and the auxiliary magnetic pole 57 may be made of a magnetic material, such as FeN or NiFe. Referring to FIG. 4, a magnetic coil, that is, a thin film coil 58 is formed between the main magnetic pole 56 and the auxiliary magnetic pole 57. A rear end of the main magnetic pole 56 is magnetically coupled to the auxiliary magnetic pole 57 by a coupling piece 59 at a central position of the thin film coil 58. In this way, the main magnetic pole 56, the auxiliary magnetic pole 57, and the coupling piece 59 form a magnetic core that passes through the central position of the thin film coil 58.

The lower shield layer 54 is connected to a first wiring pattern 61. The upper shield layer 55 is connected to a second wiring pattern 62. The first wiring pattern 61 and the second wiring pattern 62 are buried in the element incorporation film 32. The first wiring pattern 61 and the second wiring pattern 62 cooperatively establish a flow passage of a sense current. The sense current flows from the first wiring pattern 61 through the lower shield layer 54 to the magnetoresistive effect film 53. The sense current is taken from the second wiring pattern 62 through the upper shield layer 55, from the magnetoresistive effect film 53. Each of the first and second wiring patterns 61 and 62 may be made of a conductive material, such as Cu or Au.

In the element incorporation film 32, a switch element 63 is buried between the reading head element 52 and the slider body 31. The switch element 63 will be described in detail below. The switch element 63 is connected to a pair of switching wiring patterns 64 and 64. One switching wiring pattern 64 is connected to the first wiring pattern 61. The other switching wiring pattern 64 is connected to the second wiring pattern 62. By the switching wiring patterns 64, a sense current is supplied to the switch element 63. Each of the switching wiring patterns 64 and 64 may be made of a conductive material, such as Cu or Au.

Figure 5:
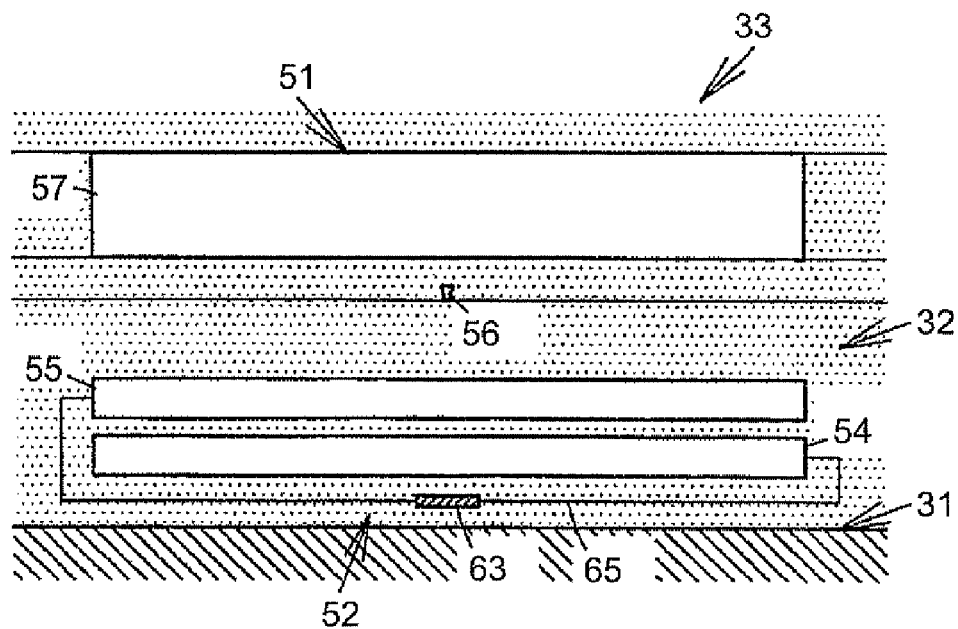
FIG. 5 is an exemplary vertical cross-sectional view taken along the line 5-5 of FIG. 4 in the embodiment.

As illustrated in FIG. 5, in the lower shield layer 54 and the upper shield layer 55, a third wiring pattern 65 is connected to the magnetoresistive effect film 53 in parallel. In this way, the third wiring pattern 65 is connected to the first and second wiring patterns 61 and 62 in parallel to the magnetoresistive effect film 53. The third wiring pattern 65 is buried in the element incorporation film 32. In the third wiring pattern 65, the switch element 63 is inserted. The switch element 63 and the third wiring pattern 65 constitute a branch circuit. The third wiring pattern 65 may be made of a conductive material, such as Cu or Au. The element incorporation film 32, the reading head element 52, the switch element 63, and the third wiring pattern 65 constitute a head module according to the embodiment.

Figure 6:
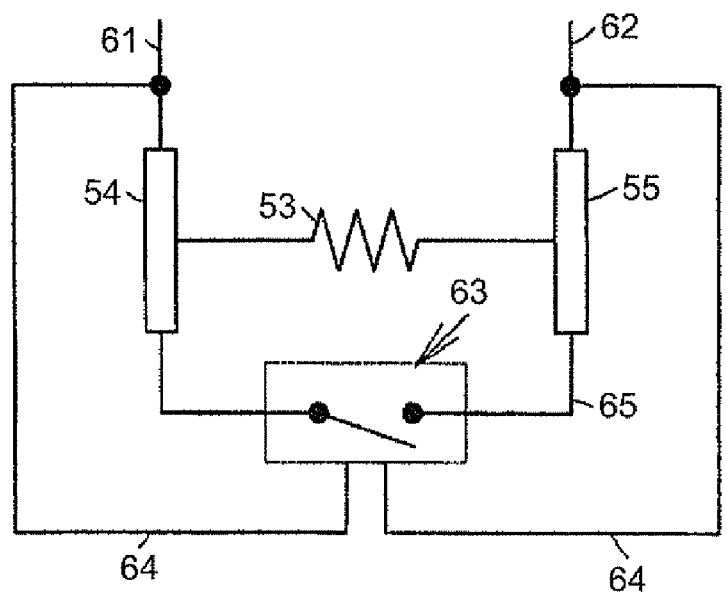
FIG. 6 is an exemplary circuit diagram of a reading head element and a switch element according to a first embodiment of the invention.

FIG. 6 illustrates a circuit diagram. The switch element 63 is supplied with a sense current from the first wiring pattern 61 through the switching wiring pattern 64. The sense current functions as a control signal of the switch element 63. The switch element 63 is opened or closed depending on whether the sense current is supplied or not. The switch element 63 changes conductivity of the third wiring pattern 65 between conduction and non-conduction, depending on the opening or the closing state thereof. The magnetoresistive effect film 53 is short-circuited on the basis of the conductivity of the third wiring pattern 65 being the conduction. In this case, a resistance value of the branch circuit that comprises the switch element 63 and the third wiring pattern 65 is set to be smaller than a resistance value of the magnetoresistive effect film 53.

Figure 7:
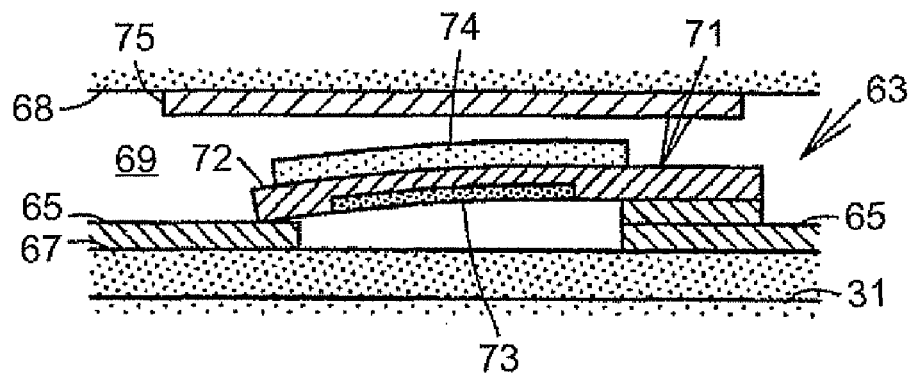
FIG. 7 is an exemplary cross-sectional view of one example of the switch element in the embodiment.

FIG. 7 illustrates one example of the switch element 63. The switch element 63 is disposed in a void 69 that is formed between a first nonmagnetic film 67 and a second nonmagnetic film 68, which are laminated on an air outflow side end face of the slider body 31. On the first nonmagnetic film 67, the third wiring patterns 65 and 65 are formed. The third wiring patterns 65 and 65 are connected by a switch piece 71. The switch piece 71 comprises a conductive piece 72. The conductive piece 72 is formed of a conductive material, such as Cu or Au. A base end of the conductive piece 72 is joined to one of the third wiring patterns 65 and 65. A front end of the conductive piece 72 is received in the other one of the third wiring patterns 65 and 65. In this way, the conduction of the third wiring pattern 65 is established.

In an inward-looking surface of the conductive piece 72, a contraction film 73 is attached. The contraction film 73 is made of ITO (Indium Tin Oxide), TiN or $Al_2O_3$. The conductive piece 72 is curved due to a contraction stress of the contraction film 73. By the curvature, the front end of the conductive piece 72 contacts the other one of the third wiring patterns 65. In an outward-looking surface of the conductive piece 72, a low thermal expansion material 74 is attached. A thermal expansion coefficient of the low thermal expansion material 74 is set to be smaller than a thermal expansion coefficient of the conductive piece 72. A heat generator, that is, a heater 75 faces the low thermal expansion material 74. In the heater 75, for example, an electrically heated wire may be used. The electrically heated wire may be made of W (Tungsten). The heater 75 is attached to the second nonmagnetic film 68. A predetermined interval is secured between the heater 75 and the switch piece 71.

Figure 8:
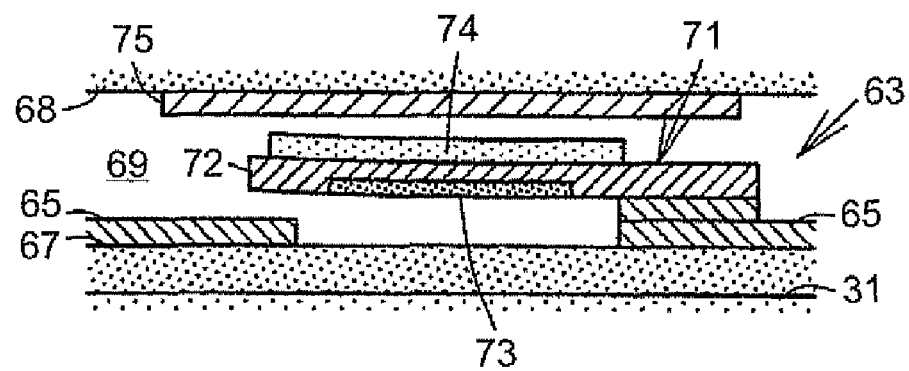
FIG. 8 is an exemplary cross-sectional view illustrating a state in which non-conduction of a third wiring pattern is established in the embodiment.

The heater 75 is connected to the switching wiring pattern 64. On the basis of a control signal supplied from the switching wiring pattern 64, that is, a sense current, the heater 75 generates heat. The heat from the heater 75 is transmitted to the conductive piece 72 and the low thermal expansion material 74. Since the thermal expansion coefficient of the low thermal expansion material 74 is set to be smaller than the thermal expansion coefficient of the conductive piece 72, the conductive piece 72 is expanded more than the low thermal expansion material 74. As a result, as illustrated in FIG. 8, due to Bimorph effect, the front end of the conductive piece 72 is kept away from the other one of the third wiring patterns 65. In this way, non-conduction of the third wiring pattern 65 is established. Therefore, the non-conduction of the third wiring pattern 65 is established only when the sense current is supplied to the magnetoresistive effect film 53.

In the floating head slider 22, the switch element 63 establishes the conduction of the third wiring pattern 65. The resistance value of the branch circuit is set to be sufficiently smaller than the resistance value of the magnetoresistive effect film 53. The branch circuit is buried in the element incorporation film 32. The branch circuit may be disposed as close as possible with respect to the magnetoresistive effect film 53. Accordingly, even though an overcurrent is generated in the flexible printed board 26 on the head suspension 21 due to an electrostatic discharge (ESD), the overcurrent flows from the first wiring pattern 61 through the third wiring pattern 65 to the second wiring pattern 62. The overcurrent is maximally suppressed from flowing through the magnetoresistive effect film 53. The magnetoresistive effect film 53 is securely prevented from being broken.

In the branch circuit according to the conventional technology, the switch element is not incorporated. In the branch circuit, for example, a resistor that has a resistance value approximately 100 times larger than the resistance value of the magnetoresistive effect film is incorporated. As a result, when a read operation is performed, a current may flow through the branch circuit. A signal to noise (S/N) ratio of a read signal may be deteriorated. Meanwhile, as described above, when the read operation is performed, the current does not flow through the branch circuit by the function of the switch element 63. Accordingly, the resistance value of the branch circuit can be set to be sufficiently smaller than the resistance value of the magnetoresistive effect film 53. When the ESD is generated, the amount of current that flows through the branch circuit can be increased.

In the reading head element 52, a current perpendicular to plane (CPP) element may be used. As the control signal of the switch element 63, a gate signal may be used, instead of the sense current.

Figure 9:
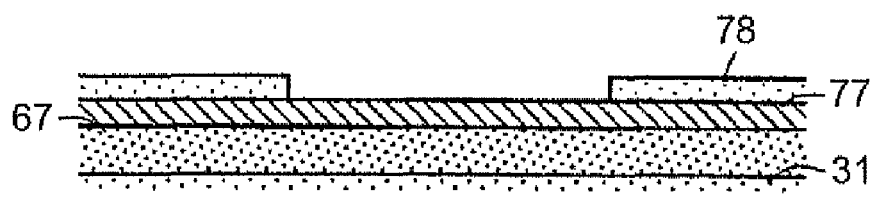
FIG. 9 is an exemplary view of a process of forming a third wiring pattern on a first nonmagnetic film in the embodiment.
Figure 10:
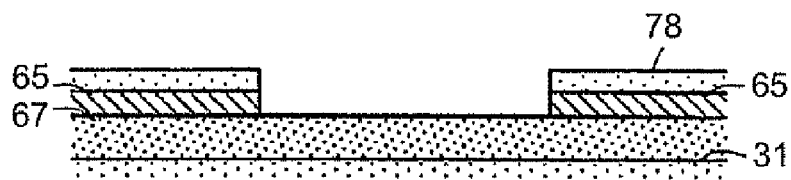
FIG. 10 is an exemplary view of a process of forming the third wiring pattern on the first nonmagnetic film in the embodiment.

Next, a method of manufacturing the element incorporation film 32 will be simply described. As illustrated in FIG. 9, the first nonmagnetic film 67 is laminated on the air outflow side end face of the slider body 31. The first nonmagnetic film 67 is, for example, made of $Al_2O_3$. A conductive material 77 is laminated on the first nonmagnetic film 67. When the conductive material 77 is laminated, plating, depositing or sputtering may be performed. The conductive material 77 is made of Cu or Au. On the conductive material 77, a resist film 78 is formed with a predetermined pattern. The resist film 78 imitates the contour of the third wiring pattern 65. Etching processing is performed on the conductive material 77 using the resist film 78. In the etching processing, dry etching processing or wet etching processing may be performed. As a result, as described in FIG. 10, the conductive material 77 is cut at the outside of the resist film 78. The resist film 78 is removed. In this way, the third wiring pattern 65 is formed on the first nonmagnetic film 67.

Figure 11:
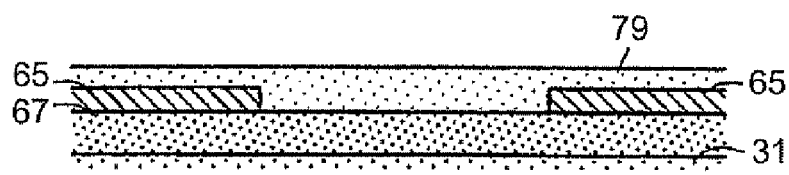
FIG. 11 is an exemplary view of a process of forming a resist film to cover the third wiring pattern on the first nonmagnetic film in the embodiment.
Figure 12:
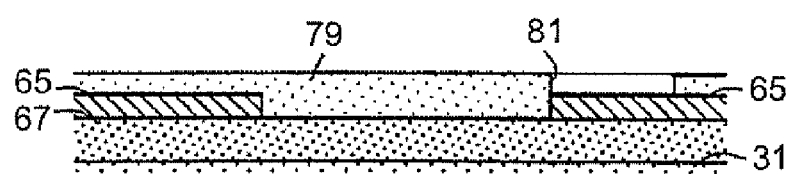
FIG. 12 is an exemplary view of a process of forming a void in the resist film in the embodiment.
Figure 13:
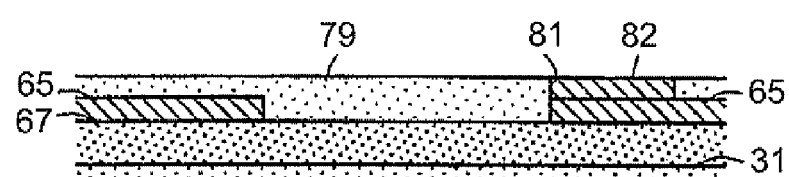
FIG. 13 is an exemplary view of a process of forming a conductive material in the void in the embodiment.
Figure 14:
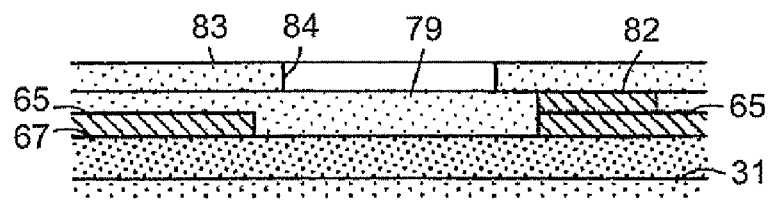
FIG. 14 is an exemplary view of a process of forming a resist film having the void on the resist film in the embodiment.
Figure 15:
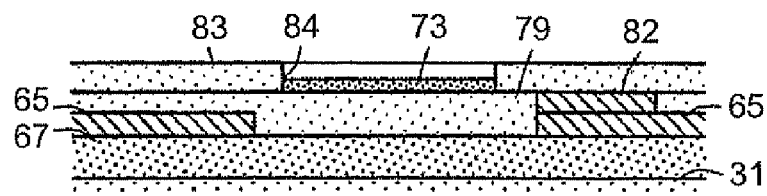
FIG. 15 is an exemplary view of a process of forming a contraction film in the void in the embodiment.
Figure 16:
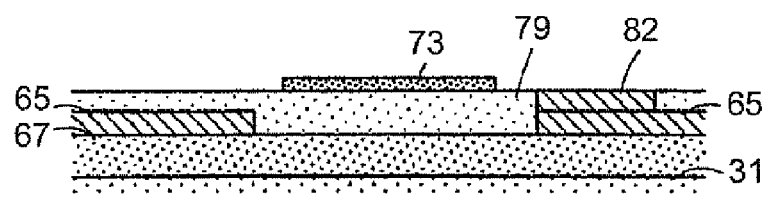
FIG. 16 is an exemplary view of a process of removing the resist film in the embodiment.

As illustrated in FIG. 11, a resist film 79 that covers the third wiring pattern 65 is formed on the first nonmagnetic film 67. As illustrated in FIG. 12, a void 81 is formed in the resist film 79. In the void 81, one of the third wiring patterns 65 is exposed. As illustrated in FIG. 13, a conductive material 82 is filled in the void 81. When the conductive material 82 is filled, plating, depositing or sputtering may be performed. The conductive material 82 is made of Cu or Au. Then, as illustrated in FIG. 14, on the resist film 79, a resist film 83 is formed with a predetermined pattern. In the resist film 83, a void 84 is formed. The void 84 imitates the contour of the contraction film 73. In the void 84, the resist film 79 is exposed. As illustrated in FIG. 15, in the void 84, the contraction film 73 is formed with a predetermined thickness. When the contraction film 73 is formed, plating, depositing, or sputtering is performed. For example, in the contraction film 73, a contraction stress is accumulated due to film contraction caused by the heat during forming the film. The contraction film 73 is made of ITO, TiN, or $Al_2O_3$. As illustrated in FIG. 16, after the contraction film 73 is formed, the resist film 83 is removed.

Figure 17:
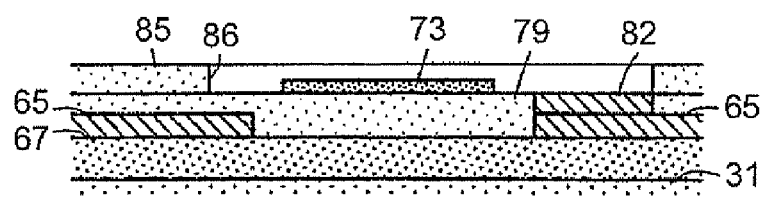
FIG. 17 is an exemplary view of a process of forming a resist film having a void on the resist film in the embodiment.
Figure 18:
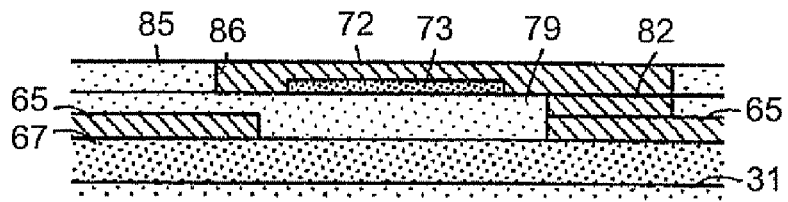
FIG. 18 is an exemplary schematic view of a process of forming a conductive piece in the void in the embodiment.
Figure 19:
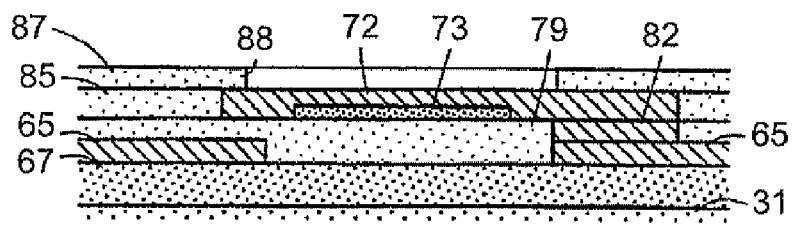
FIG. 19 is an exemplary view of a process of forming a resist film having a void on the resist film in the embodiment.
Figure 20:
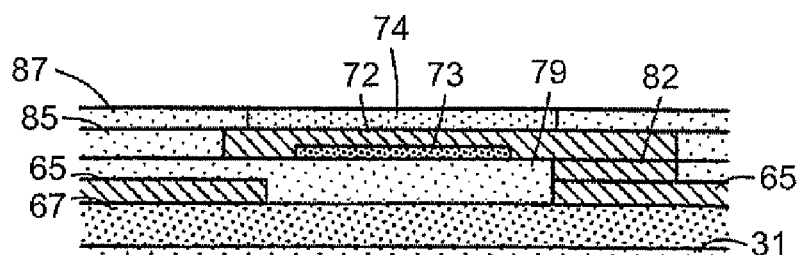
FIG. 20 is an exemplary view of a process of forming a low thermal expansion material in the void in the embodiment.

As illustrated in FIG. 17, on the resist film 79, a resist film 85 is formed with a predetermined pattern. In the resist film 85, a predetermined void 86 is formed. The void 86 imitates the contour of the conductive piece 72. In the void 86, the contraction film 73 is disposed. As illustrated in FIG. 18, the conductive piece 72 is laminated in the void 86. The conductive piece 72 is made of Cu or Au. Then, as illustrated in FIG. 19, on the resist film 85, a resist film 87 is formed with a predetermined pattern. In the resist film 87, a void 88 is formed. The void 88 imitates the contour of the low thermal expansion material 74. In the void 88, the conductive piece 72 is partially exposed. As illustrated in FIG. 20, the low thermal expansion material 74 is laminated in the void 88.

Figure 21:
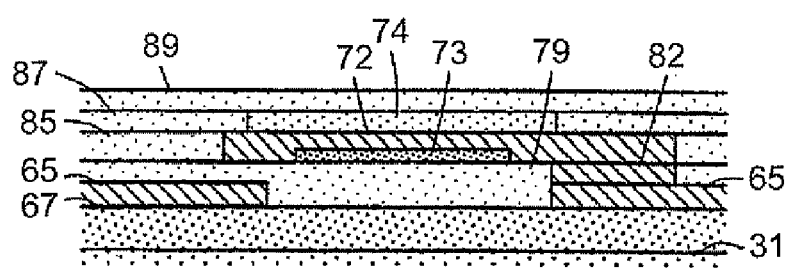
FIG. 21 is an exemplary view of a process of further forming a resist film on the resist film in the embodiment.
Figure 22:
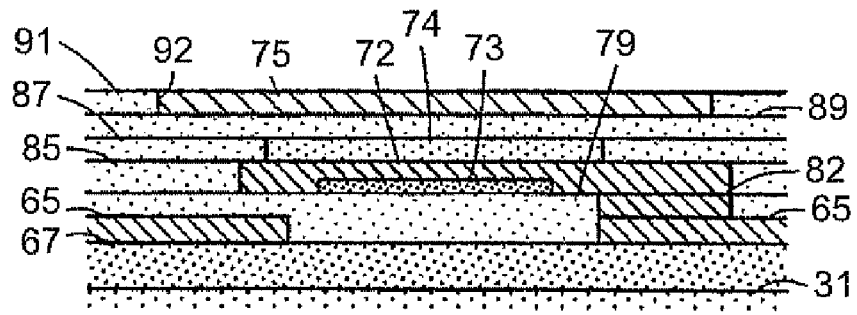
FIG. 22 is an exemplary view of a process of forming a heat generator on the resist film in the embodiment.
Figure 23:
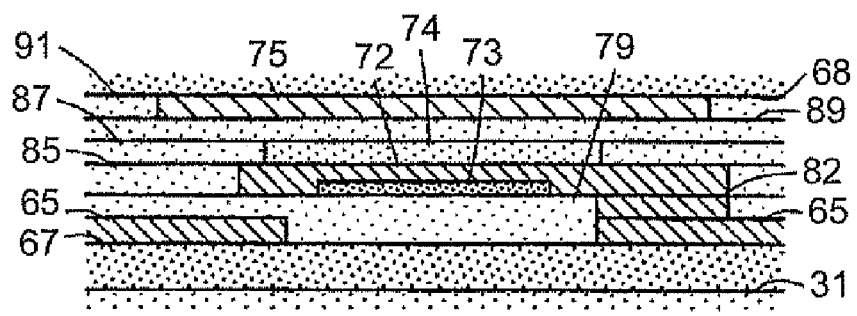
FIG. 23 is an exemplary schematic view of a process of forming a second nonmagnetic film on the resist film in the embodiment.
Figure 24:
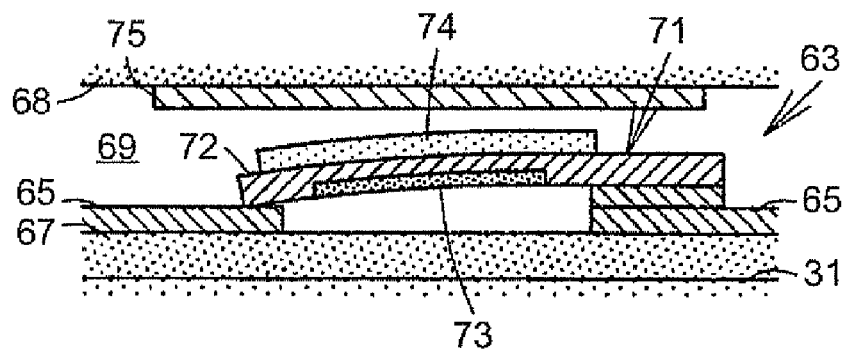
FIG. 24 is an exemplary view of removing the resist film between the first and second nonmagnetic films in the embodiment.

As illustrated in FIG. 21, a resist film 89 is formed on the resist film 87. As illustrated in FIG. 22, on the resist film 89, a resist film 91 is formed with a predetermined pattern. In the resist film 91, a void 92 is formed. The void 92 imitates the contour of the heater 75. In the void 92, the heater 75 is laminated. The heater 75 is made of, for example, W. As illustrated in FIG. 23, on the resist film 91, the second nonmagnetic film 68 is formed. The second nonmagnetic film 68 is made of, for example, $Al_2O_3$. Then, as illustrated in FIG. 24, the resist films 79, 85, 87, 89, and 91 are removed. When the resist films are removed, for example, wet etching processing may be performed. In this way, the void 69 is formed between the first and second nonmagnetic films 67 and 68. In the void 69, the switch element 63 is formed. When the resist films 79, 85, 87, 89, and 91 are removed, a contraction stress of the contraction film 73 is removed. As a result, the contraction stress causes the conductive piece 72 to be curved. By the curvature, the other end of the conductive piece 72 contacts the other third wiring pattern 65.

Then, on the second nonmagnetic film 68, the reading head element 52 and the single magnetic pole head 51 are sequentially laminated. In this way, the element incorporation film 32 is formed. When the reading head element 52 is formed, the third wiring pattern 65 is connected to the first and second wiring patterns 61 and 62 in parallel to the magnetoresistive effect film 53. When the reading head element 52 is formed, the conductive piece 72 already establishes conduction of the third wiring pattern 65. Therefore, at the same time as formation of the reading head element 52, the branch circuit short-circuits the magnetoresistive effect film 53. For example, even though the overcurrent is generated when the floating head slider 22 is attached to the head suspension 21, the magnetoresistive effect film 53 is securely prevented from being broken. The switch element 63 is simultaneously formed in the course of manufacturing the element incorporation film 32. The switch element 63 is relatively simply formed.

Figure 25:
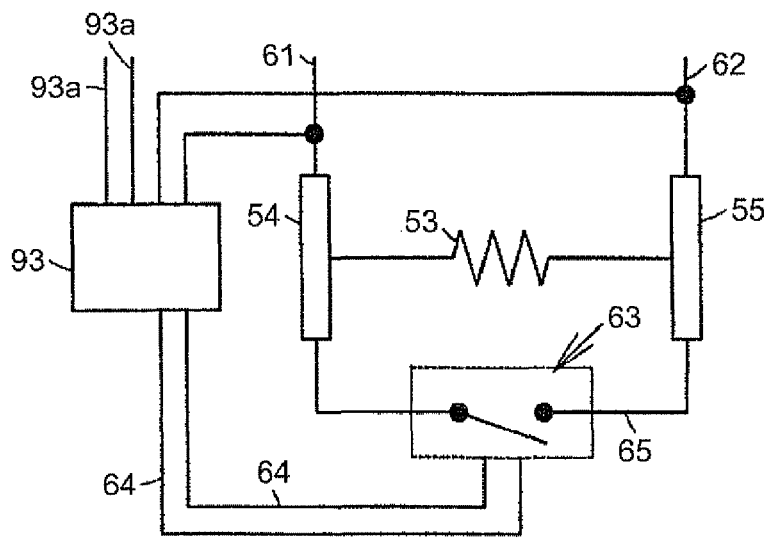
FIG. 25 is an exemplary circuit diagram of a reading head element and a switch element according to a second embodiment of the invention.

As illustrated in FIG. 25, an amplifying circuit 93 may be connected to the switching wiring pattern 64. The amplifying circuit 93 is connected to power wiring patterns 93a and 93a that supply power to the amplifying circuit 93. The amplifying circuit 93 can amplify a sense current that is supplied from the first wiring pattern 61, on the basis of a current supplied form the power wiring patterns 93a. The amplified sense current is supplied from the switching wiring pattern 64 to the heater 75. In this way, conduction and non-conduction of the third wiring pattern 65 may be switched. In addition, the same components as the above-described components are denoted by the same reference numerals.

Figure 26:
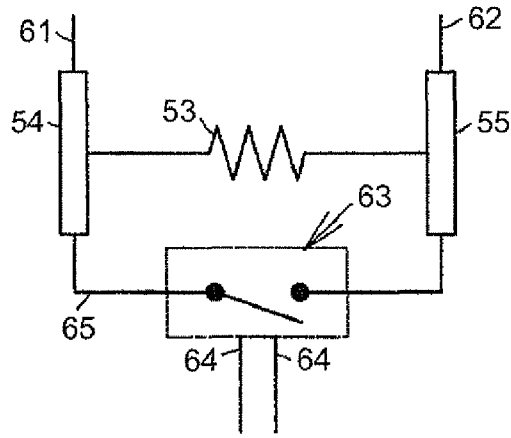
FIG. 26 is an exemplary circuit diagram of a reading head element and a switch element according to a third embodiment of the invention.
Figure 27:
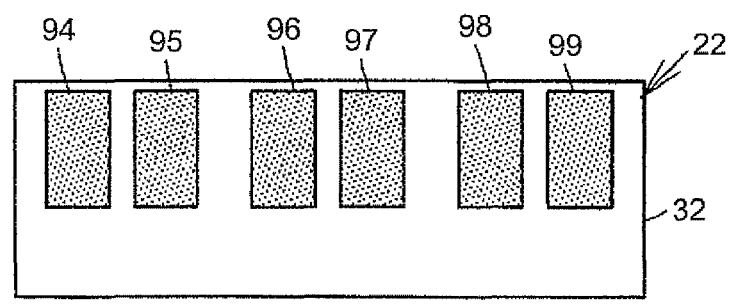
FIG. 27 is an exemplary lateral view of a head slider that is observed from an air outflow side end face in the embodiment.

As illustrated in FIG. 26, a control signal, that is, a current may be individually supplied from the head IC to the switching wiring pattern 64. As illustrated in FIG. 27, in the floating head slider 22, that is, in the air outflow side end face of the element incorporation film 32, first to sixth conductive terminals, that is, first to sixth electrode terminals 94 to 99 are formed. The first electrode terminal 94 is connected to the first wiring pattern 61. A second electrode terminal 95 is connected to the second wiring pattern 62. The third and fourth electrode terminals 96 and 97 are connected to the switching wiring pattern 64. The fifth and sixth electrode terminals 98 and 99 are connected to a wiring pattern (not illustrated) for write that is connected to the thin film coil 58 of the single magnetic pole head 51.

The first to sixth electrode terminals 94 to 99 are connected to a wiring pattern that extends on the flexible printed board 26. In this way, the first wiring pattern 61 is supplied with a sense current from the first electrode terminal 94. The sense current is taken from the second electrode terminal 95. Meanwhile, the heater 75 or the amplifying circuit 93 is supplied with a current from the third electrode terminal 96. The current is taken from the fourth electrode terminal 97. As described above, however, when the switching wiring pattern 64 is connected to the first and second wiring patterns 61 and 62, the third and fourth electrode terminals 96 and 97 may not be formed.

Figure 28:
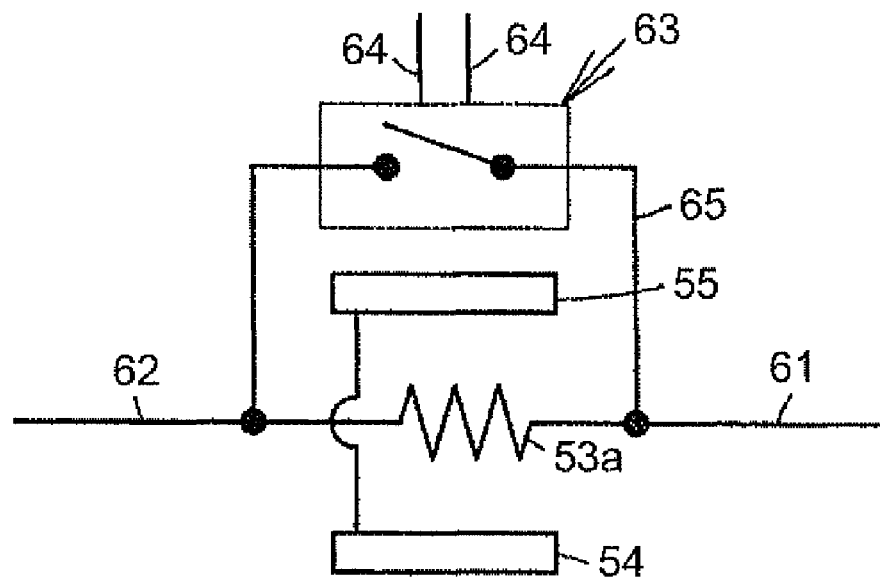
FIG. 28 is an exemplary circuit diagram of a reading head element and a switch element according to a fourth embodiment of the invention.

As illustrated in FIG. 28, in the floating head slider 22, a giant magnetoresistive (GMR) effect element of a current in plane (CIP) type may be used, instead of the TMR element. In the GMR element, a magnetoresistive effect film 53a is disposed between the lower shield layer 54 and the upper shield layer 55. The third wiring pattern 65 is connected to the first and second wiring patterns 61 and 62 in parallel to the magnetoresistive effect film 53a. In addition, the same components as the above-described components are denoted by the same reference numerals.

According to the above-described configuration, the sense current is supplied from the first wiring pattern 61 to the magnetoresistive effect film 53a. The sense current is taken from the second wiring pattern 62. Similar to the above case, when the sense current is not supplied, conduction of the third wiring pattern 65 is established. When the conduction is established, the overcurrent flows from the first wiring pattern 61 through the third wiring pattern 65 to the second wiring pattern 62. The overcurrent is maximally suppressed from flowing through the magnetoresistive effect film 53a. The magnetoresistive effect film 53a is securely prevented from being broken.

Figure 29:
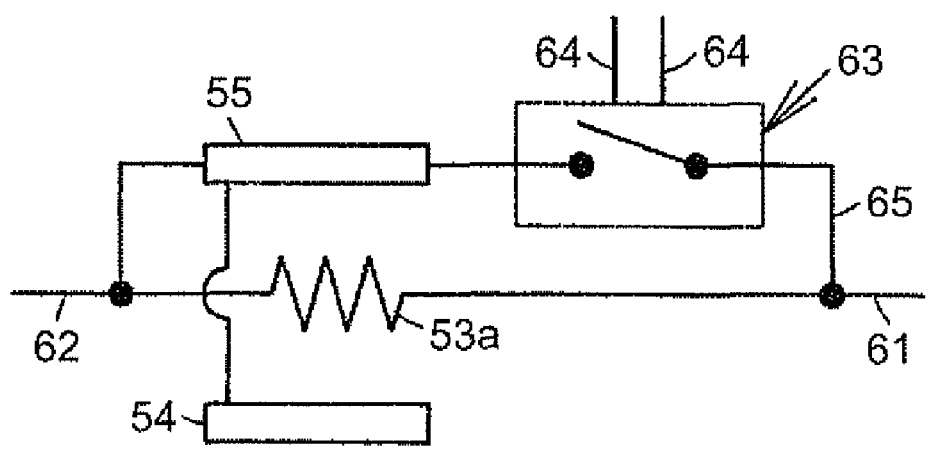
FIG. 29 is an exemplary circuit diagram of a reading head element and a switch element according to a fifth embodiment of the invention.

As illustrated in FIG. 29, the third wiring pattern 65 may be connected to the upper shield layer 55. In this way, the switch element 63 and the upper shield layer 55 are connected in series. In addition, the same components as the above-described components are denoted by the same reference numerals. According to the above-described configuration, at the time of conduction of the third wiring pattern 65, the overcurrent flows from the first wiring pattern 61 through the third wiring pattern 65 to the second wiring pattern 62. The overcurrent is maximally suppressed from flowing through the magnetoresistive effect film 53. The magnetoresistive effect film 53 is securely prevented from being broken.

Figure 30:
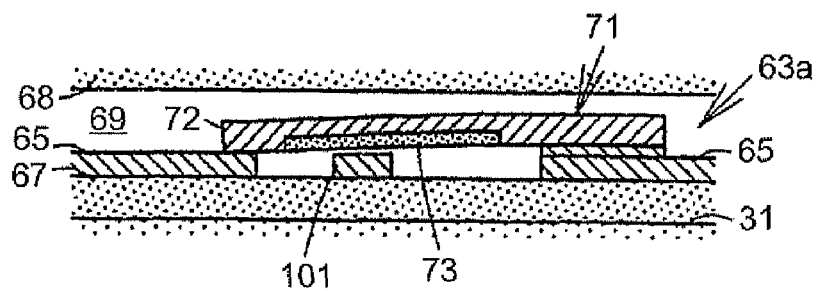
FIG. 30 is an exemplary cross-sectional view of a schematic structure of another example of the switch element in the embodiment.

As illustrated in FIG. 30, in the floating head slider 22, a switch element 63a may be incorporated, instead of the above-described switch element 63. In the switch element 63a, the low thermal expansion material 74 and the heater 75 are not formed. On the first nonmagnetic film 67, a heat generator, that is, a high thermal expansion material 101 is disposed. The high thermal expansion material 101 may be made of Cu or Au. The high thermal expansion material 101 is connected to the switching wiring pattern 64. The high thermal expansion material 101 faces the contraction film 73. A front end of the conductive piece 72 contacts the other third wiring pattern 65 by the contraction stress of the contraction film 73. In addition, the same components as those in the above-described switch element 63a are denoted by the same reference numerals.

Figure 31:
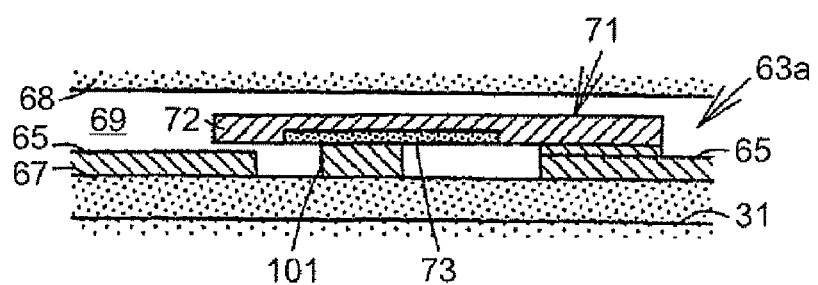
FIG. 31 is an exemplary cross-sectional view illustrating a state in which non-conduction of a third wiring pattern is established in the embodiment.

In the switch element 63a, if a current is supplied to the high thermal expansion material 101, the high thermal expansion material 101 is expanded. Due to the expansion, the high thermal expansion material 101 contacts the contraction film 73. As a result, as illustrated in FIG. 31, the high thermal expansion material 101 pushes up the conductive piece 72 against the contraction stress of the contraction film 73. The front end of the conductive piece 72 is distant from the other third wiring pattern 65. The conductivity of the third wiring pattern 65 is changed between conduction and non-conduction. Similar to the above-described case, when the sense current is not supplied, conduction of the third wiring pattern 65 is established. The overcurrent is maximally suppressed from flowing through the magnetoresistive effect film 53 (53a). The magnetoresistive effect film 53 (53a) is securely prevented from being broken.

Figure 32:
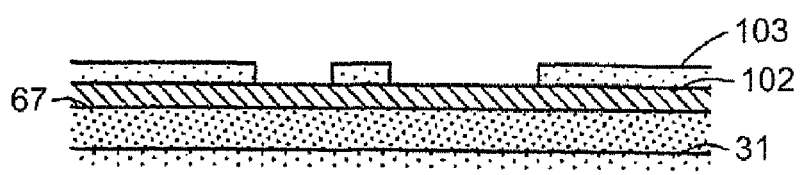
FIG. 32 is an exemplary view of a process of forming a third wiring pattern and a heat generator on a first nonmagnetic film in the embodiment.
Figure 33:
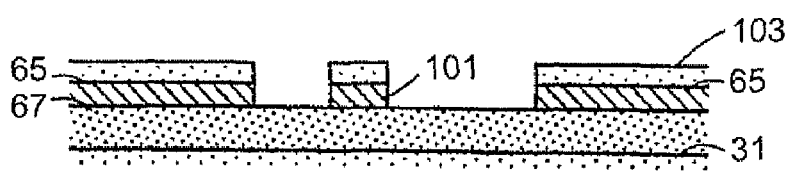
FIG. 33 is an exemplary view of a process of forming a third wiring pattern and a heat generator on the first nonmagnetic film in the embodiment.

Next, a method of manufacturing the element incorporation film 32 will be simply described. As illustrated in FIG. 32, the first nonmagnetic film 67 is laminated on the air outflow side end face of the slider body 31. On the first nonmagnetic film 67, a conductive material 102 is laminated. When the conductive material 102 is laminated, plating, depositing or sputtering may be performed. The conductive material 102 is made of Cu or Au. On the conductive material 102, a resist film 103 is formed with a predetermined pattern. The resist film 103 imitates the contour of the third wiring pattern 65 and the high thermal expansion material 101. Etching processing is performed on the conductive material 102 using the resist film 103. At the time of etching processing, dry etching processing or wet etching processing may be performed. As a result, as described in FIG. 33, the conductive material 102 is cut at the outside of the resist film 103. The resist film 103 is removed. In this way, the high thermal expansion material 101 and the third wiring pattern 65 are formed on the first nonmagnetic film 67.

Figure 34:
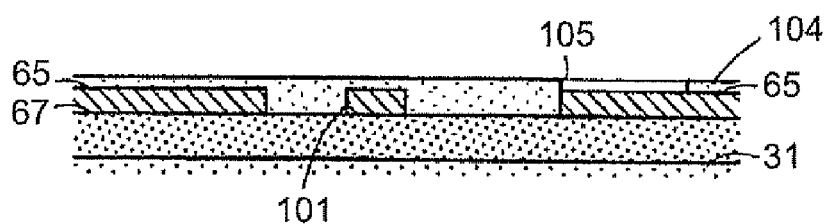
FIG. 34 is an exemplary view of a process of forming a resist film to cover a third wiring pattern and a heat generator on the first nonmagnetic film in the embodiment.
Figure 35:
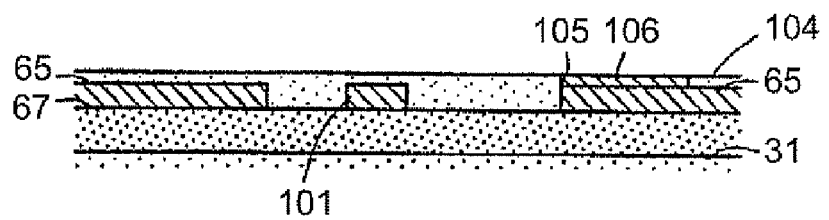
FIG. 35 is an exemplary view of a process of forming a conductive material in a void in the embodiment.
Figure 36:
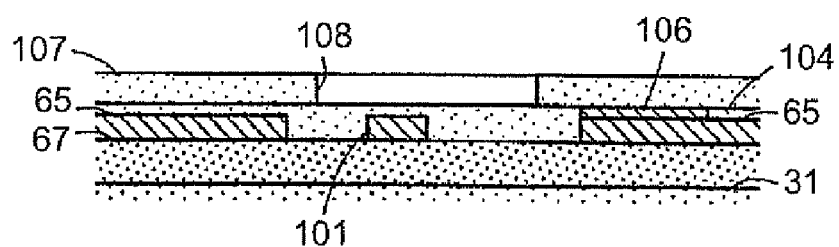
FIG. 36 is an exemplary view of a process of forming a resist film having a void on the resist film in the embodiment.
Figure 37:
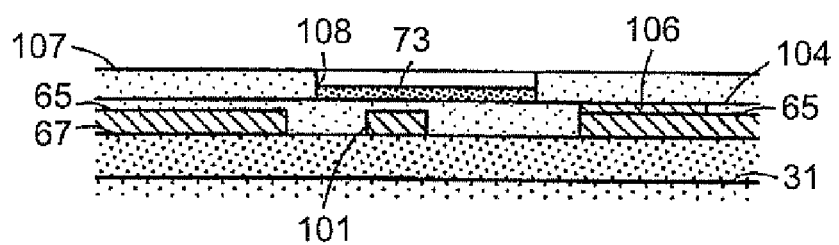
FIG. 37 is an exemplary view of a process of forming a contraction film in the void in the embodiment.

As illustrated in FIG. 34, a resist film 104 that covers the third wiring pattern 65 and the high thermal expansion material 101 is formed on the first nonmagnetic film 67. A void 105 is formed in the resist film 104. As illustrated in FIG. 35, a conductive material 106 is laminated in the void 105. Then, as illustrated in FIG. 36, on the resist film 104, a resist film 107 is further formed with a predetermined pattern. In the resist film 107, a void 108 is formed. The void 108 imitates the contour of the contraction film 73. As illustrated in FIG. 37, the contraction film 73 is laminated in the void 108. When the contraction film 73 is laminated, sputtering is performed. For example, in the contraction film 73, a contraction stress is accumulated due to film contraction caused by the heat.

Figure 38:
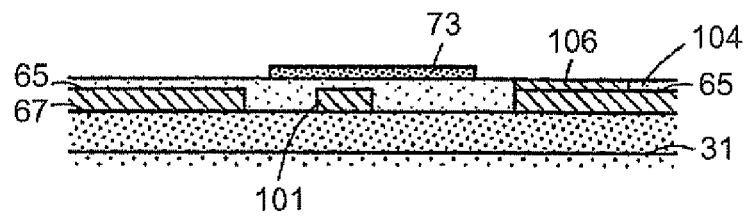
FIG. 38 is an exemplary view of a process of removing the resist film in the embodiment.
Figure 39:
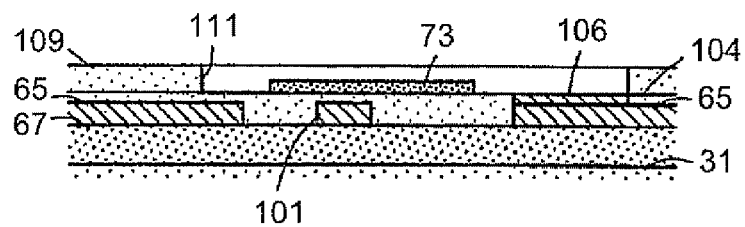
FIG. 39 is an exemplary view of a process of forming a resist film having a void on the resist film in the embodiment.
Figure 40:
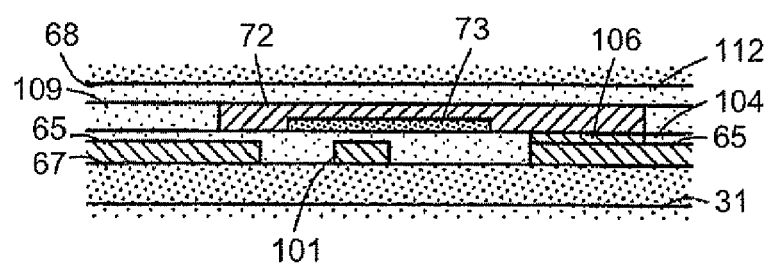
FIG. 40 is an exemplary view of a process of further forming a resist film on the resist film in the embodiment.

As illustrated in FIG. 38, the resist film 107 is removed. As illustrated in FIG. 39, on the resist film 104, a resist film 109 is formed with a predetermined pattern. In the resist film 109, a void 111 is formed. The void 111 imitates the contour of the conductive piece 72. As illustrated in FIG. 40, the conductive piece 72 is laminated in the void 111. Then, a resist film 112 is formed on the resist film 109. The second nonmagnetic film 68 is formed on the resist film 112.

Figure 41:
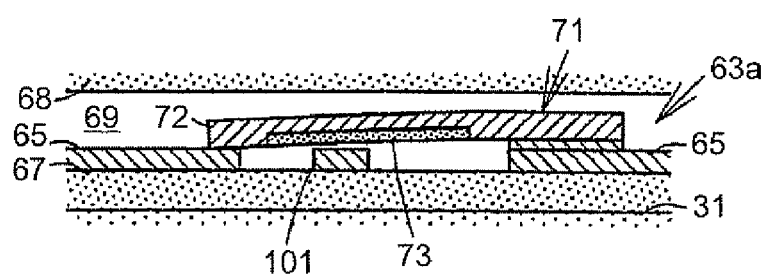
FIG. 41 is an exemplary view of a process of removing the resist film between first and second nonmagnetic films in the embodiment.

As illustrated in FIG. 41, the resist films 104, 109, and 112 are removed. When the resist films are removed, wet etching processing may be performed. In this way, the void 69 is formed between the first and second nonmagnetic films 67 and 68. The switch element 63a is formed in the void 69. When the resist films 104, 109, and 112 are removed, the contraction stress of the contraction film 73 is removed. As a result, the contraction stress causes the conductive piece 72 to be curved. By the curvature, the front end of the conductive piece 72 contacts the other third wiring pattern 65.

On the second nonmagnetic film 68, the reading head element 52 and the single magnetic pole head 51 are sequentially laminated. In this way, the element incorporation film 32 is laminated. When the reading head element 52 is formed, the reading head element 52 is connected to the first and second wiring patterns 61 and 62 in parallel to the magnetoresistive effect film 53 (53a). When the reading head element 52 is formed, the conductive piece 72 already establishes conduction of the third wiring pattern 65. As a result, the branch circuit short-circuits the magnetoresistive effect film 53 (53a) at the same time as formation of the reading head element 52. Even though the overcurrent is generated when the floating head slider 22 is attached to the head suspension 21, the magnetoresistive effect film 53 (53a) is securely prevented from being broken. The switch element 63a is simultaneously formed in the course of manufacturing the element incorporation film 32. The switch element 63a is relatively simply formed.

Figure 42:
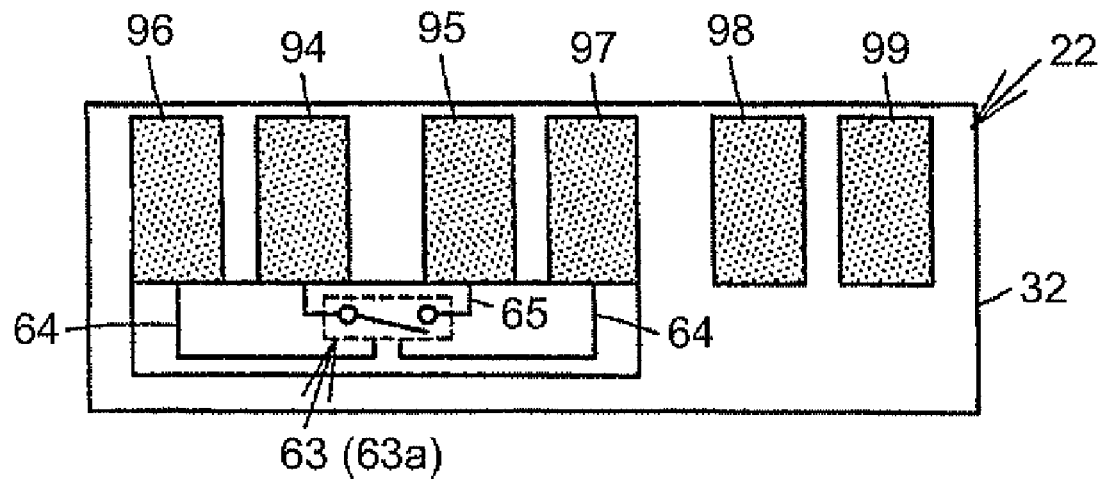
FIG. 42 is an exemplary lateral view of the head slider that is observed from an air outflow side end face in the embodiment.
Figure 43:
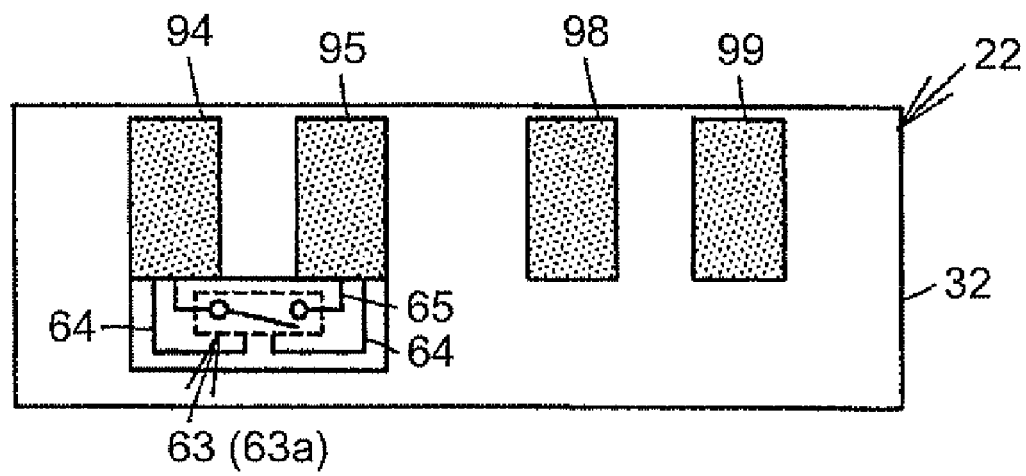
FIG. 43 is an exemplary lateral view of the head slider that is observed from an air outflow side end face in the embodiment.

As illustrated in FIG. 42, the switch element 63 (63a) may be disposed on the air outflow side end face of the element incorporation film 32. As apparent from FIG. 42, the arrangement of the first to fourth electrode terminals 94 to 97 may change. In this case, the first and second electrode terminals 94 and 95 may be disposed between the third and fourth electrode terminals 96 and 97. The third wiring pattern 65 is connected to the first and second electrode terminals 94 and 95. The third wiring pattern 65 is connected to the switch element 63 (63a). The switching wiring pattern 64 is connected to the third and fourth electrode terminals 96 and 97. In addition, the same components as the above-described components are denoted by the same reference numerals. In the floating head slider 22, the switch element 63 (63a) is formed at the same time as formation of the element incorporation film 32. When the switching wiring pattern 64 is connected to the first and second wiring patterns 61 and 62, as illustrated in FIG. 43, the third and fourth electrode terminals 96 and 97 may not be formed.

In the head slider according to any one of the aforementioned embodiments, the switch element establishes the conduction of the third wiring pattern. The magnetoresistive effect film is short-circuited. Accordingly, even though an overcurrent is generated by an electrostatic discharge, the overcurrent flows from the first wiring pattern through the third wiring pattern to the second wiring pattern. The overcurrent is maximally suppressed from flowing through the magnetoresistive effect film. The switch element or the third wiring pattern is buried in the nonmagnetic film. The switch element or the third wiring pattern may be disposed as close as possible with respect to the magnetoresistive effect film. In addition, the switch element or the third wiring pattern may be formed at the same time as formation of the magnetoresistive effect film. The magnetoresistive effect film is securely prevented from being broken.

In the head slider according to any one of the aforementioned embodiments, the switch element may comprise a heat generator configured to be buried in the nonmagnetic film and generate heat and a switch configured to face the heat generator, deform by the heat generated by the heat generator, and switch the conductivity of the third wiring pattern into the non-conduction. At this time, a current may be used when the heat generator generates the heat. According to this configuration, formation of a dedicated wiring pattern in the heat generator is omitted. Accordingly, the configuration of the head slider can be simplified.

Such switch element may be buried in the nonmagnetic film between the reading head and the slider body. When the head slider is formed, on the slider body, the switch element is formed before the reading element is formed. Accordingly, when the reading head is formed, the switch element is already formed. As a result, when the reading head is formed, the magnetoresistive effect film can be prevented from being broken. The head slider having the above configuration may be incorporated in a storage medium driving device.

According to the manufacturing method of anyone of the aforementioned embodiments, the switch element is formed on the first nonmagnetic film. The switch element establishes conduction between the wiring patterns. The second nonmagnetic film is formed on the switch element. The magnetoresistive effect film is formed on the second nonmagnetic film. Accordingly, when the magnetoresistive effect film is formed, the switch element is already formed. As a result, the magnetoresistive effect film can be securely prevented from being broken.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A head slider, comprising:
a slider body;
an insulating nonmagnetic film laminated on an air outflow side end face of the slider body;
a magnetoresistive effect film in the nonmagnetic film;

first and second magnetic, conductive shield layers in the nonmagnetic film and connected to each other through the magnetoresistive effect film interposed therebetween;

a first wiring pattern in the nonmagnetic film and connected to the magnetoresistive effect film through the first shield layer;

a second wiring pattern in the nonmagnetic film and connected to the magnetoresistive effect film through the second shield layer;

a third wiring pattern in the nonmagnetic film and connected to the first and second shield layers in parallel to the magnetoresistive effect film; and a switching element in the nonmagnetic film and configured to switch conductivity of the third wiring pattern between conduction and non-conduction.

2. The head slider of claim 1, wherein the switch element comprises:

a heat generator in the nonmagnetic film and configured to generate heat; and a switch portion facing the heat generator, configured to deform due to the heat, and to switch the conductivity of the third wiring pattern into the non-conduction, wherein the heat generator is configured to generate the heat by a portion of a sense current supplied to the magnetoresistive effect film through the first and second wiring patterns.

3. The head slider of claim 2, wherein the heat generator is configured to generate the heat by an electric current supplied to a fourth wiring pattern, which is for the switching element, connected to the heat generator when the sense current is supplied.

4. The head slider of claim 2, wherein the switching element is in the nonmagnetic film between a reading head comprising the magnetoresistive effect film and the slider body.

5. The head slider of claim 2, wherein the heat generator is configured to generate the heat by the sense current, a portion of the sense current being amplified.

6. A storage medium driving device that positions a head slider to a target position on a storage medium, the head slider comprising:

a slider body;

an insulating nonmagnetic film laminated on an air outflow side end face of the slider body;

a magnetoresistive effect film in the nonmagnetic film;

first and second magnetic and electrically conductive shield layers in the nonmagnetic film and connected to each other through the magnetoresistive effect film interposed therebetween;

a first wiring pattern in the nonmagnetic film and connected to the magnetoresistive effect film through the first shield layer;

a second wiring pattern in the nonmagnetic film and connected to the magnetoresistive effect film through the second magnetic and electrically conductive shield layer;

a third wiring pattern in the nonmagnetic film and connected to the first and second shield layers in parallel to the magnetoresistive effect film; and a switching element in the nonmagnetic film and configured to switch the conductivity of the third wiring pattern between conduction and non-conduction.

7. A method of manufacturing a head slider, comprising:

forming a first pair of wiring patterns on an insulating first nonmagnetic film on a base at a predetermined interval;

forming a switching element comprising a conductive portion to conduct between the first pair of wiring patterns;

forming a resist film in a space, allowing a deformation of the conductive portion due to Bimorph effect;

forming a second nonmagnetic film on the resist film;

removing the resist film to create a void, and connecting the first pair of wiring patterns with each other by the deformation of the conductive portion into the void;

forming a magnetoresistive effect film on the second nonmagnetic film; and forming a second pair of wiring patterns connected to the magnetoresistive effect film, wherein the first pair of wiring patterns are connected to the second pair of wiring patterns in parallel to the magnetoresistive effect film.

* * * * *